L. S. BEALS & P. THOMAS.
Molding Handles of Celluloid and Similar Materials on Cutlery and other Articles.
No. 222,229. Patented Dec. 2, 1879.
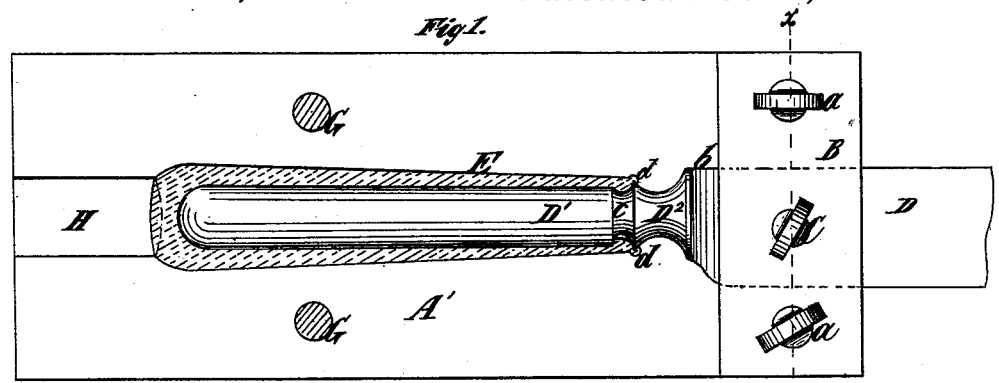
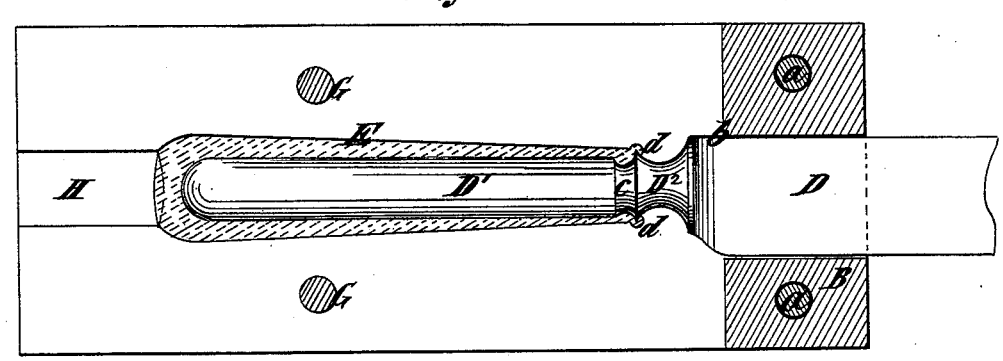
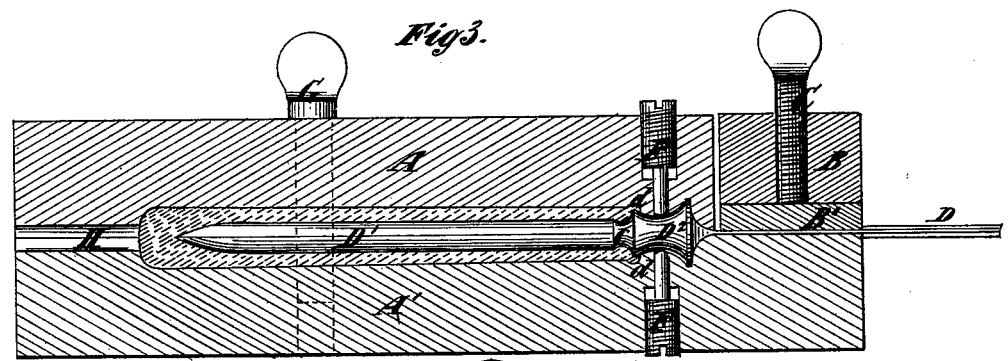
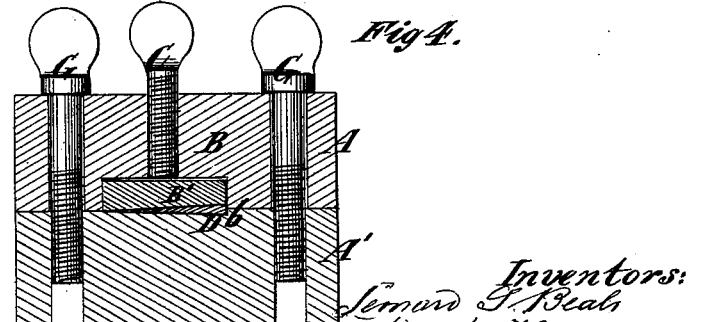

UNITED STATES PATENT OFFICE.

LEONARD S. BEALS AND PHILIP THOMAS, OF ASTORIA, NEW YORK.

IMPROVEMENT IN MOLDING HANDLES OF CELLULOID AND SIMILAR MATERIALS ON CUTLERY AND OTHER ARTICLES.

Specification forming part of Letters Patent No. 222,229, dated December 2, 1879; application filed October 6, 1879.

*To all whom it may concern:*

Be it known that we, LEONARD S. BEALS and PHILIP THOMAS, both of Astoria, in the county of Queens and State of New York, have invented certain new and useful Improvements in Forming and Applying Handles of Cutlery and other Articles, of which the following is a specification.

Our invention is intended for use in the manufacture of table-knives the handles of which are formed by placing the tang of the knife in a mold and forcing any suitable composition which is rendered plastic by heat or otherwise in around the tang.

In the manufacture of such knives it is desirable that the tangs should be made as large as possible, so as to balance the weight of the blade, and also to save the composition used to form the handle, which is generally more expensive than the metal. It has, however, been difficult to make knives with such large tangs successfully, owing to the difficulty in properly centering the tangs in the mold so that they shall be covered equally at all parts with the composition; and the object of our invention is to provide for properly centering and adjusting the tang while the mold is open.

To this end our invention consists in the combination, with a mold composed of two longitudinally-separable parts, of a clamping device attached to one of said parts, in which the knife or other article may be clamped and securely held, while the other part of the mold is detached and the mold open, and the position of the tang or end of the knife or other article in the interior of the mold may be seen.

It also consists in the combination, with such a mold and clamp, of screws inserted in said mold and adapted to impinge against the opposite sides of the bolster of the knife.

It also consists in details of construction to be hereinafter explained.

In the accompanying drawings, Figure 1 represents a plan view of the part of the mold to which the clamp for securing the knife is attached. Fig. 2 is a similar view, the clamp being shown in section. Fig. 3 is a longitudinal section through the two parts of the mold and the clamp, and Fig. 4 is a transverse section on the dotted line $x$ $x$, Fig. 1.

Similar letters of reference designate corresponding parts in all the figures.

The mold is made of two parts or sections, A A′, divided longitudinally, and one of which, A′, is somewhat longer than the other part, A.

To the part A′ is securely attached, as here shown by screws $a$, a clamping device consisting of a bridge-piece, B, having an opening through which the tang of a knife may be inserted and provided with a screw, C, which bears upon the blade D and securely clamps the knife in place. The straight back of the knife-blade rests against the shoulder $b$ in the part A′ of the mold, and is thus held so that its tang D′ is central in the hollow E in the mold by which the handle is shaped, and requires no lateral adjustment. To compensate for the taper of the knife-blade, and enable the clamping-screw C to have a flat bearing, we preferably interpose a taper or wedge-like packing-piece, B′, between the point of the screw and the blade, which also serves to wedge and keep the back of the knife tight against the shoulder $b$.

In order to provide for adjusting the tang of the knife vertically, in case it should not lie centrally in the mold, or not be in line with the blade, (which can be readily ascertained, as the mold is now open,) we provide adjusting-screws F extending from opposite sides of the mold, and the points of which bear upon the opposite sides of the knife-bolster $D^2$.

By arranging the screws F to bear upon the bolster they are brought to bear as closely to the tang as possible, and are more advantageous than screws bearing directly on the tang, as the latter leave holes in the composition which must be afterward filled up.

The tang of the knife is preferably provided immediately back of the bolster $D^2$ with a groove, $c$, and the surrounding portion of the mold is so constructed as to produce an increased thickness of material immediately in rear of the bolster and opposite to said groove. The object of such groove is to provide an increased thickness of composition at the part where the tang of the knife is liable to become rusted, owing to water and air getting under the edge of the composition of the handle. We also preferably flow or force the composition over the edge of the bolster, in order to prevent the handle from being loosened or displaced by shrinkage or otherwise before the composition is hardened. This latter may be effected by forming a small concave recess, $d$, in the mold opposite the edge of the said bolster. The bead formed by this recess may be allowed to remain, or it may, after the composition has hardened, be ground off so as to leave the handle flush with the edge of the bolster.

After the screws F are adjusted so as to properly center the tang the two parts A A' are put together and held by screws G. The mold is then clamped or held in a rigid securing device, and the plastic composition forced by a very heavy pressure through an opening, H, in the end of the mold.

If desirable, two or more cavities might be made in the same mold, and the mold provided with two or more clamping devices and sets of adjusting-screws, so that two or more handles might be made at once.

Though our invention is especially adapted for knives, it might be employed to form and apply handles to whips, canes, parasols, or other metal or wood articles.

By our invention we provide for very conveniently and accurately centering the tangs while the mold is open, and hence while the position of the tang and the amount of adjustment required can be readily seen.

What we claim as our invention, and desire to secure by Letters Patent, is—

1. The combination, with a mold for forming and applying the handles of cutlery and other articles consisting of two longitudinally-separable parts or sections, of a clamping device attached to one of said parts, and serving to hold the knife or other article in proper position in the mold, substantially as specified.

2. The combination, with the two parts or sections A A', of the bridge-piece B, attached to one of said parts, and the screw C, whereby the knife is clamped and held in position, substantially as specified.

3. The combination, with the two parts or sections A A', of the bridge-piece B, attached to one of said parts, the screw C, and the taper or wedge-like packing-piece B', adapted to be interposed between the said screw and a knife-blade, substantially as specified.

4. The combination, with the two parts or sections A A', one of which, A', is provided with a shoulder, $b$, against which the back of a knife may rest, of the bridge-piece B, and screw C, for clamping and holding the knife in position against the said shoulder, substantially as specified.

5. The combination, with the two parts or sections A A', of a blade-clamping device attached to one of said parts and adjusting-screws F, extending from opposite sides of the mold, and adapted to impinge against opposite sides of the knife bolster $D^2$, substantially as specified.

6. The tang provided with a groove, $c$, so proportioned to the surrounding portion of the mold as to provide for an increased thickness of composition immediately in rear of the bolster, substantially as specified.

LEONARD S. BEALS.
PHILIP THOMAS.

Witnesses:
FREDK. HAYNES,
E. P. JESSUP.